(12) United States Patent
Sun et al.

(10) Patent No.: US 12,188,909 B2
(45) Date of Patent: Jan. 7, 2025

(54) TESTING AND CHARACTERIZATION FOR INITIAL FATIGUE DAMAGE AND DEVELOPMENT PROCESS OF VULCANIZED RUBBER

(71) Applicant: TSINGTAO UNIVERSITY OF SCIENCE & TECHNOLOGY, Shandong (CN)

(72) Inventors: Xuehong Sun, Shandong (CN); Congwei Liu, Shandong (CN); Xinjian Xu, Shandong (CN); Qiang Wang, Shandong (CN)

(73) Assignee: TSINGTAO UNIVERSITY OF SCIENCE & TECHNOLOGY, Shandong (CN)

(*) Notice: Subject to any disclaimer, the term of this patent is extended or adjusted under 35 U.S.C. 154(b) by 288 days.

(21) Appl. No.: 17/909,391

(22) PCT Filed: Oct. 28, 2021

(86) PCT No.: PCT/CN2021/126914
§ 371 (c)(1),
(2) Date: Sep. 5, 2022

(87) PCT Pub. No.: WO2023/035379
PCT Pub. Date: Mar. 16, 2023

(65) Prior Publication Data
US 2023/0221230 A1     Jul. 13, 2023

(30) Foreign Application Priority Data
Sep. 8, 2021     (CN) .......................... 202111047987.9

(51) Int. Cl.
*G01N 3/34*     (2006.01)
*G01N 3/06*     (2006.01)

(52) U.S. Cl.
CPC ................. *G01N 3/34* (2013.01); *G01N 3/06* (2013.01); *G01N 2203/0005* (2013.01);
(Continued)

(58) Field of Classification Search
CPC .... G01N 3/34; G01N 3/06; G01N 2203/0005; G01N 2203/0017; G01N 2203/0073;
(Continued)

(56) References Cited

U.S. PATENT DOCUMENTS 12,031,012 B2 * 7/2024 Gao ........................... C08J 3/22
2022/0112361 A1 * 4/2022 Gao ..................... C08K 5/3437

FOREIGN PATENT DOCUMENTS

CN     105199153 A  * 12/2015
CN     108250682 A  *  7/2018
(Continued)

OTHER PUBLICATIONS

CN-105199153-A, English Translation (Year: 2015).*
(Continued)

*Primary Examiner* — Ryan D Walsh
(74) *Attorney, Agent, or Firm* — JCIPRNET

(57) ABSTRACT

The present invention provides a testing and characterization method for an initial fatigue damage and development process of vulcanized rubber, and falls within the technical field of rubber. The testing and characterization method comprises the following steps: preparing vulcanized rubber; preparing test samples; preparing fatigue testing specimens; and characterizing an initial fatigue damage and development process. The testing and characterization method provided by the present invention is simple, and closely associates a simple and easy-to-implement macro mechanical property test with changes of an internal microstructure, which are difficult to observe and analyze; and the method (Continued)

is high in efficiency and easy for operation and data collection, and data measured has good reference.

7 Claims, 4 Drawing Sheets

(52) U.S. Cl.
CPC ............... *G01N 2203/0017* (2013.01); *G01N 2203/0073* (2013.01); *G01N 2203/025* (2013.01); *G01N 2203/0268* (2013.01); *G01N 2203/0298* (2013.01); *G01N 2203/0682* (2013.01); *G01N 2203/0688* (2013.01); *G01N 2203/0694* (2013.01)

(58) Field of Classification Search
CPC ..... G01N 2203/025; G01N 2203/0268; G01N 2203/0298; G01N 2203/0682; G01N 2203/0688; G01N 2203/0694
See application file for complete search history.

(56) References Cited

FOREIGN PATENT DOCUMENTS

| | | | |
|---|---|---|---|
| CN | 112266505 A | * | 1/2021 |
| JP | H0625471 A | * | 2/1994 |
| JP | 2009168741 A | * | 7/2009 |
| JP | 2020085701 A | * | 6/2020 |

OTHER PUBLICATIONS

CN-108250682-A, English Translation (Year: 2018).*
CN-112266505-A, English Translation (Year: 2021).*
JP-2009168741-A, English Translation (Year: 2009).*
JP-2020085701-A, English Translation (Year: 2020).*
JP-H0625471-A, English Translation (Year: 1994).*
"International Search Report (Form PCT/ISA/210) of PCT/CN2021/126914," mailed on Jun. 8, 2022, pp. 1-5.
"Written Opinion of the International Searching Authority (Form PCT/ISA/237) of PCT/ CN2021/126914," mailed on Jun. 8, 2022, pp. 1-4.

* cited by examiner vulcanized rubber not filled with the carbon black vulcanized rubber filled with 20 phr of carbon black vulcanized rubber filled with 50 phr of carbon black

TESTING AND CHARACTERIZATION FOR INITIAL FATIGUE DAMAGE AND DEVELOPMENT PROCESS OF VULCANIZED RUBBER

CROSS-REFERENCE TO RELATED APPLICATION

This application is a 371 of international application of PCT application serial no. PCT/CN2021/126914, filed on Oct. 28, 2021, which claims the priority benefit of China application no. 202111047987.9, filed on Sep. 8, 2021. The entirety of each of the above mentioned patent applications is hereby incorporated by reference herein and made a part of this specification.

TECHNICAL FIELD

The present invention relates to the technical field of rubber, and in particular to a testing and characterization for an initial fatigue damage and development process of vulcanized rubber.

BACKGROUND ART

For rubber products that are used under dynamic conditions, their early damages and durability are of most concern to manufacturers and users. The fatigue damage of rubber parts is one of main factors that cause early damages and shorten service life of rubber products. The fatigue damage of rubber materials can be divided into two phases including micro-crack initiation and crack propagation. At present, although there are many testing and characterization methods for the fatigue life of the vulcanized rubber, a research method for a fatigue damage process mainly comprises analytical simulation based on finite element software, and real-time measurement and control analysis based on special equipment.

A finite element simulation (FES) is performed by firstly selecting characteristic parameters and conditions for deformation under stress of a material. The rubber material has viscoelasticity and the variability of its characteristic parameters is great, and the accuracy of characteristic parameters determines the credibility of simulation results, and therefore, the FES analysis for fatigue damages of the rubber material is still in an exploratory stage.

A method for performing real-time measurement and control analysis by using special equipment (such as MTS) can apply fatigues of different modes to rubber materials or finished products, track the changes of related mechanical properties of vulcanized rubber online, and analyze the changes in combination with a microscopic test means (super-zoom camera equipment). The advantage of this method is the capability of continuously monitoring in real time and obtaining relevant information of fatigue damages of the rubber materials, and the disadvantages thereof are that special equipment is required, the investment on equipment is high, and it is difficult to test multiple samples at the same time.

Therefore, it is urgent for current rubber research field and rubber industry to develop a simple and easy testing and characterization method for causes and a development process of fatigue damages of vulcanized rubber.

SUMMARY OF THE INVENTION

An objective of the present invention is to provide a method capable of effectively characterizing a fatigue damage and development process of vulcanized rubber.

To achieve the above objective, the present disclosure provides the following technical solution.

The present invention provides a testing and characterization method for an initial fatigue damage and development process of vulcanized rubber, comprising the following steps:

(1) preparing vulcanized rubber:
preparing a rubber compound according to a test formula designed for testing rubber, and vulcanizing the rubber compound to obtain a vulcanized test piece;

(2) preparing test samples:
cutting the vulcanized test piece into type 2 dumbbell-shaped test samples according to the requirements specified in GB/T 528-2009, and recording each 5 dumbbell-shaped test samples as one group;

(3) preparing fatigue testing specimens:
testing the fatigue life of the test samples by using a fatigue tester, and firstly carrying out a fatigue life test on one set of test samples to obtain the number of fatigue life cycles of the test samples;
setting a pre-set number of fatigue test cycles of the test samples according to the total fatigue life cycles of the test samples;
testing in accordance with GB/T 1688-2008; after the testing samples are tested for the pre-set number of fatigue cycles, taking off the testing samples to obtain fatigue testing specimens;

(4) characterizing the initial fatigue damage and development process determining the stress at definite elongation of the fatigue testing specimens of different fatigue cycles by using a tensile machine, and plotting for the fatigue cycles by using the stress at definite elongation to obtain a fatigue life curve, wherein in the curve results:

from the starting point of the curve, along with the increase of the fatigue cycles, if the stress at definite elongation drops linearly, this section of curve characterizes that the vulnerable structure in the rubber is damaged; if the curve is gentle, the curve represents that the inner structure of the rubber is not damaged;

subsequently, along with the increase of the fatigue cycles, if the stress at definite elongation increases to the first peak, this section of curve characterizes that macromolecular chains in the rubber slip and short chains in a chemical cross-linked structure extend to produce an orientation;

a higher peak characterizes a greater produced amplitude of variation;

subsequently, along with the increase of the fatigue cycles, if the stress at definite elongation drops to the trough, this section of curve characterizes that a carbon black aggregate in the rubber is separated from a rubber matrix to produce micro-damages; a higher dropping amplitude of the curve characterizes a higher speed at which the damages occur; a lower trough of the curve characterizes a more severe degree of damages;

subsequently, along with the increase of the fatigue cycles, if the stress at definite elongation increases to the second peak, this section of curve characterizes that initial damages of the rubber appear, micro-damage points in the rubber propagate and the macromolecular chains in the rubber are oriented; a higher height of the second peak in the curve characterizes a greater extent of orientation;

finally, along with the increase of the fatigue cycles, if the stress at definite elongation slowly drops, this section of curve characterizes that micro-cracks in the rubber propagate until the macrostructure is damaged; and a longer dropping duration of the curve characterizes a longer fatigue life of the rubber.

Preferably, in Step (1), the thickness of the vulcanized test piece may be 2.00 mm±0.2 mm.

Preferably, in Step (3), the fatigue tester may be a De Mattia rubber flexural fatigue tester.

Preferably, in Step (3), the testing mode of the fatigue test life may be tensile fatigue, and testing conditions of the tensile fatigue comprise tensile strain, frequency and temperature.

Preferably, in Step (3), a principle for pre-setting is that the test cycles may be as dense as possible in the initial period, and data intervals may be widened in the middle and later periods.

Preferably, in Step (4), the fatigue tester may be a Zwick electronic tensile testing machine.

Preferably, in Step (4), the stress at definite elongation may be 100%, 200% or 300% stress at definite elongation.

The present invention has the following beneficial effects:

1. The testing and characterization method provided by the present invention is low in investment and wide in applicable range covering medium- and small-sized rubber enterprises, especially tire enterprises. It can be implemented with only one set of rubber flexural fatigue tester, and therefore, the present invention has a wide application prospect.
2. The testing and characterization method provided by the present invention is simple, and closely associates a simple and easy-to-implement macro mechanical property test with changes of an internal microstructure, which are difficult to observe and analyze; and the method is high in efficiency and easy for operation and data collection, and data measured has good reference.
3. The testing and characterization method provided by the present invention has many variables under which the initial fatigue damage and development process of the vulcanized rubber can be tested and characterized, such as different frequencies, temperatures and tensile deformations.

DETAILED DESCRIPTION OF THE INVENTION

Figure 1:
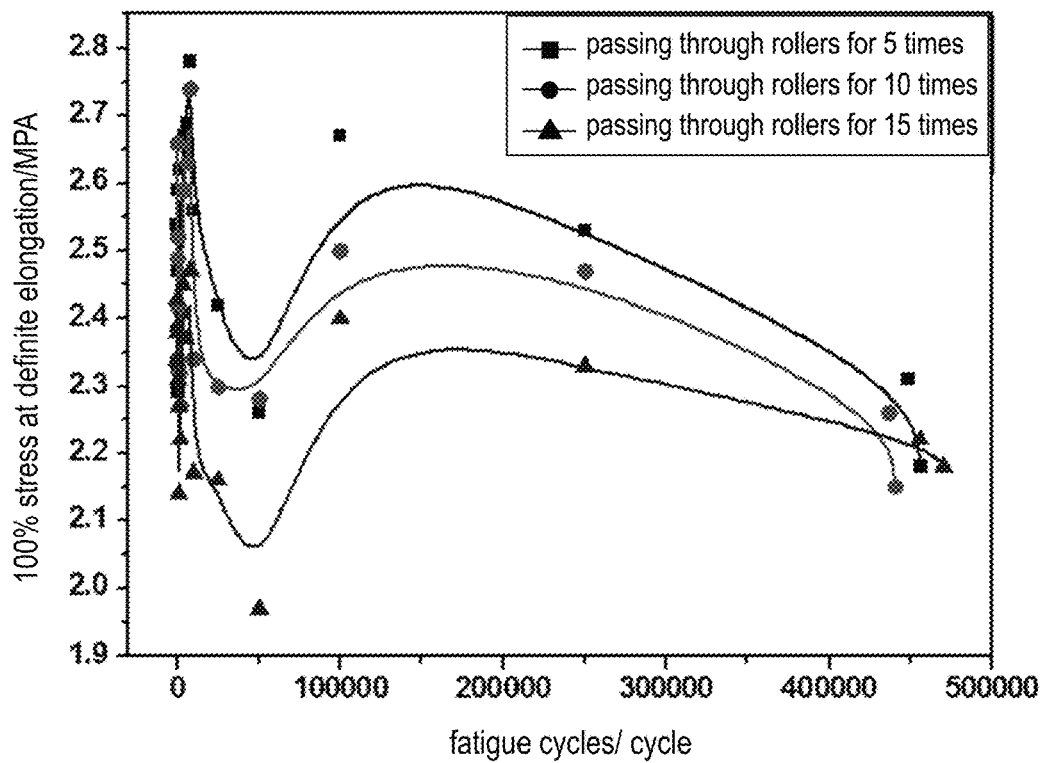
FIG. 1 is a fatigue characteristic curve of vulcanized rubber after different times of thinning and passing through rollers (under 100% stress at definite elongation)

To clearly explain the technical characteristics of the present solution, the present solution will be described below in conjunction with a specific embodiment.

EXAMPLE 1

1. Preparation of the following formula: experimental raw materials were weighed according to a formula of tread rubber for truck tires: 100 phr of NR, 50 phr of carbon black N234, 1.3 phr of sulfur, 1.1 phr of an accelerant NS, 3.5 phr of zinc oxide, 2.0 phr of stearic acid, 2.0 phr of an anti-aging agent 4020, 1.0 phr of an anti-aging agent RD, and 1.5 phr of microcrystalline wax.

2. Preparation of vulcanized rubber: an internal mixer was used for mixing, with the initial temperature set to 80° C. and the rotor speed of 80 rpm; after the initial temperature was reached, NR was added and mixed for 1 min; then, zinc oxide and stearic acid were mixed to 1 minutes and 30 seconds, and one half of carbon black was added and mixed to 2 minutes and 30 seconds; then, the anti-aging agents, the microcrystalline wax and the remaining carbon black were added and were continually mixed to 4 minutes; and rubber discharge was performed to obtain pre-mixed rubber. The pre-mixed rubber was subjected to thinning and passing through rollers for 5 times, 10 times and 15 times on an open mill, respectively. After the treatment, vulcanization and batch out were performed. The parameters of the open mill were set as follows: the roller speed ratio was 25/18, the roller temperature was 45° C., and the initial roller pitch was 0.8 mm. After the rollers were covered with the rubber, NS and sulfur were added for continuous mixing; after being combined with the powder, the rubber was cut for 3 times on ¾ parts of left and right sides, respectively; and after the roller pitch was adjusted to carry out thinning and passing through rollers for 5 times, batch out was performed and roller pitch for carrying out the batch out was 1.8 mm. After being cooled and placed for 8 hours, the compound rubber was tested for vulcanization characteristics at 150° C. The vulcanization for test pieces was performed on an HS-100T-RTMO plate vulcanizing machine according to the determined process optimum cure time $t_{90}$.

3. Preparation of test samples: a type 2 dumbbell-shaped test sample was cut into a plurality of strips according to the requirements of GB/T 528-2009, and every 5 dumbbell-shaped test samples were grouped; and each piece of process rubber was cut into 30 groups of test samples.

4. Preparation of fatigue testing specimens: a dynamic fatigue test was performed by using a De Mattia rubber flexural fatigue tester, with the tensile strain of 300% strain, fatigue frequency of 5 Hz, and fatigue cycles of 0, 100, 200, 400, 600, 800, 1000, 2000, 4000, 6000, 8000, 10000, 25000, 50000, 100000, 250000 and 400000, respectively. The testing specimens were taken off after each group of testing specimens reached the pre-set fatigue cycles, and were placed for later use. The last group of testing specimens were tested until fatigue damages were caused to obtain testing specimens with different fatigue cycles of three types of process rubber. After they were placed for 24 hours, a tensile stress-strain performance test was performed.

Figure 2:
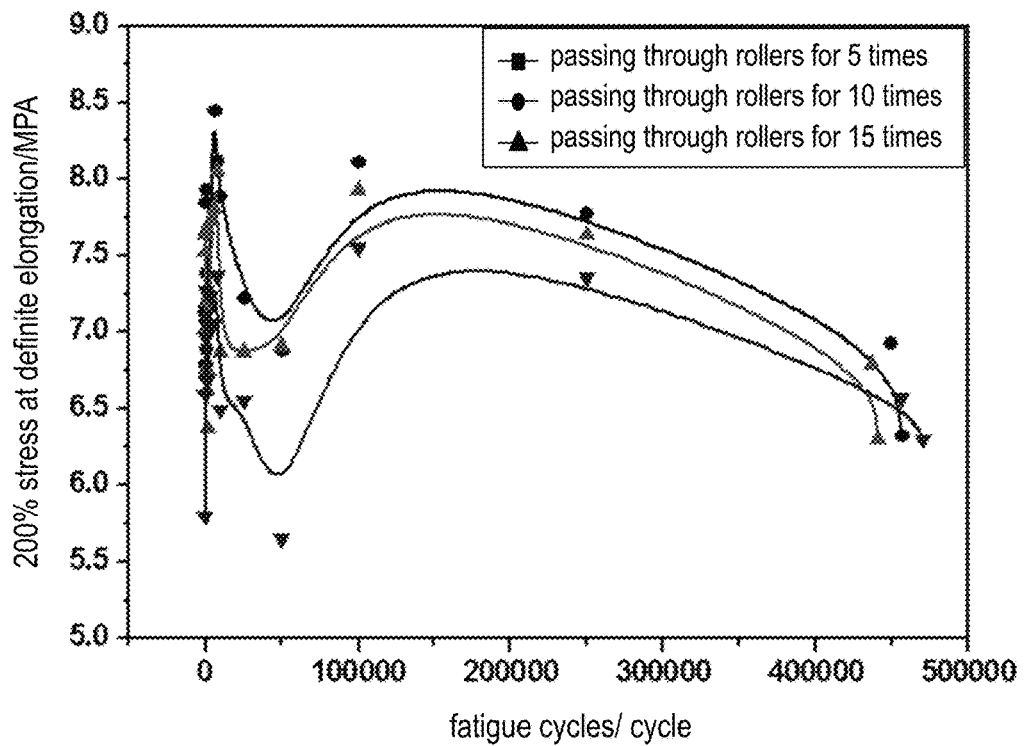
FIG. 2 is a fatigue characteristic curve of vulcanized rubber after different times of thinning and passing through rollers (under 200% stress at definite elongation)
Figure 3:
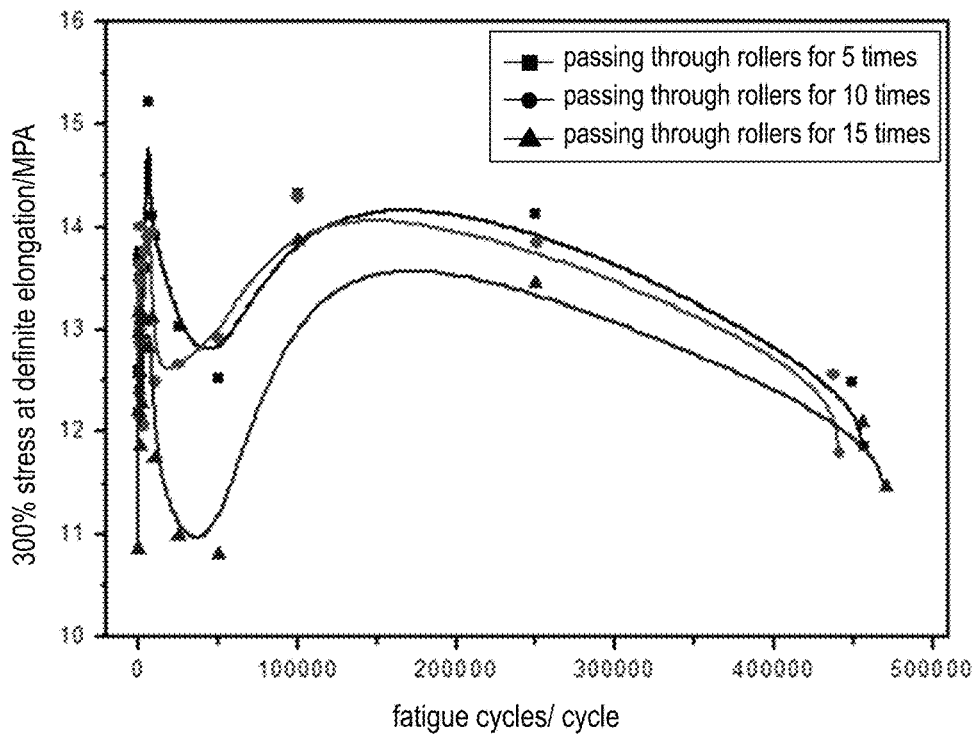
FIG. 3 is a fatigue characteristic curve of vulcanized rubber after different times of thinning and passing through rollers (under 300% stress at definite elongation)

Characterization of the initial fatigue damage and development process: 100%, 200% and 300% stresses at definite elongation of the testing specimens with different fatigue cycles were determined by using a Zwick electronic tensile testing machine, and were used to plot for the fatigue cycles to obtain fatigue characteristic curves of three types of process rubber, as shown in FIGS. 1, 2 and 3. The difference among three types of process rubber in terms of the time when initial damages occur, the initial damage degree and the end time of initial damage phase during the fatigue process can be characterized through the falling range of initial stress at definite elongation, the peak width and peak value of the first peak, the times of reaching the trough and the falling range of initial stress at definite elongation at the trough. Following the trough, the change trend of the stress at definite elongation can reflect the difference of initial damage point expansion processes of three types of process rubber.

Figure 4:
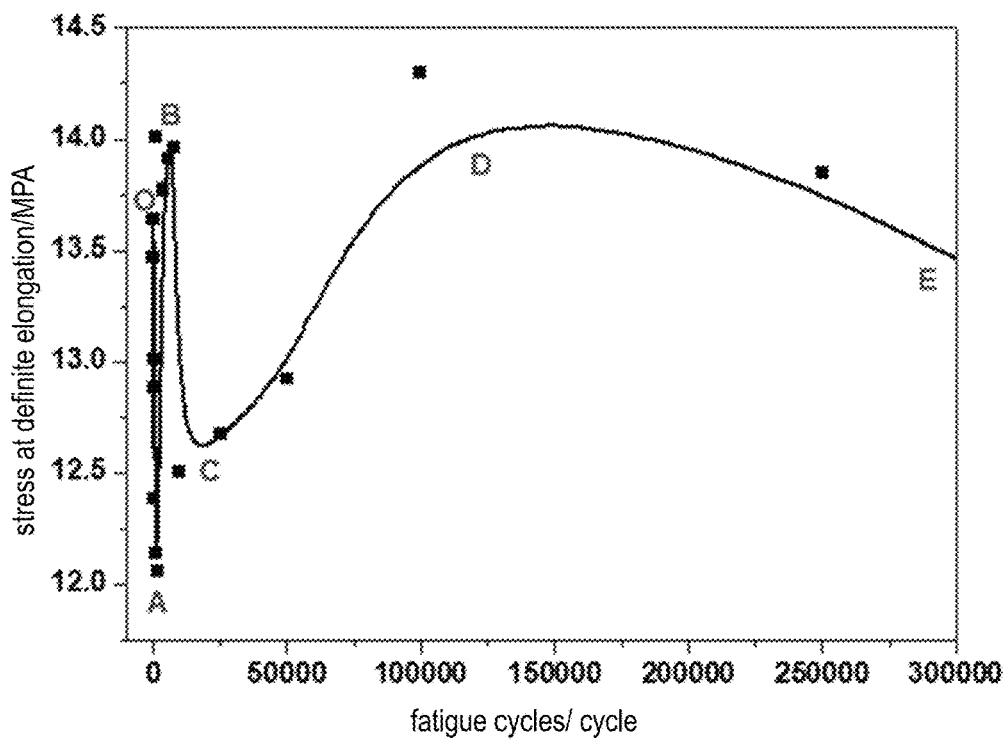
FIG. 4 is a fatigue characteristic curve of vulcanized rubber after thinning and passing through rollers for 10 times (under 300% stress at definite elongation)

For example, the fatigue curve of vulcanized rubber after thinning and passing through rollers for 10 times (under 300% stress at definite elongation) in FIG. 4 includes:

1) Segment O-A: The stress at definite elongation drops abruptly within short time during the initial fatigue phase; this curve segment can characterize micro-defects that occur in the rubber, including filler networks, weak bonds and large size and low fracture strength.

2) Segment A-B: After the stress at definite elongation is adjusted to drop to the lowest point within a short time, the curve tends to raise to the highest point (Point B) with the increase of fatigue degree; and this curve segment characterizes that rubber macromolecular chains on the surfaces of carbon black particles slip and are oriented, and a higher position of Point B indicates a higher the degree of slip and orientation.

3) Segment B-C: The stress at definite elongation starts to drop after reaching the highest point (Point B), characterizing that when the stress reaches the highest point, the slip and orientation of macromolecular chains in the rubber are combined to reach the ultimate state. Meanwhile, fatigue continues, and weak parts (adsorption and tangling of the surfaces of carbon black particles, short chains between the carbon black particles, weak bonds in a rubber matrix, etc.) will be gradually damaged. Since the sizes of carbon black or compounding agent particle aggregates and the thicknesses of rubber layers between particles in the aggregates are different and the damage speeds are different, the stress at definite elongation gradually drops within a certain range of time until reaching the lowest point (Point C).

At the moment, it characterizes that initial damages appear in the rubber and micro-damage points are produced; an SEM image illustrates that the edges of the carbon black particle aggregates are obviously and partially separated from the rubber matrix;

when the decreasing speed of the stress at definite elongation on the segment B-C is more rapid, the peak A-B-C is narrower, indicating that the damage speed is more rapid; and when the Point C is lower, the degree of damage is more severe.

4) Segment C-D: Following Point C, the rubber matrix bears the main stress after micro-damage points are produced; under the action of the stress, the rubber macromolecular chains in the matrix are oriented and the stress at definite elongation is increased after orientation; meanwhile, the micro-damage points produced on the segment B-C gradually propagate under the action of stress to form micro-cracks. The production of micro-cracks will result in the dropping of stress at definite elongation, but the orientation of macromolecular chains contributes more to the stress at definite elongation. Therefore, the stress at definite elongation on the segment C-D tends to rise; and when Point D is higher, the extent of orientation is greater.

5) Segment D-E: Following Point D, the stress at definite elongation slowly drops, characterizing that the orientation of molecular chains is completed; under the continuous action of stress, the main change of the inner structure of material is that a larger damaged area is formed due to continuous expansion of the micro-cracks produced in the segment C-D, resulting in that the stress at definite elongation drops until micro damages are finally caused; and when the duration of segment D-E is longer, the fatigue life is longer.

Figure 5:
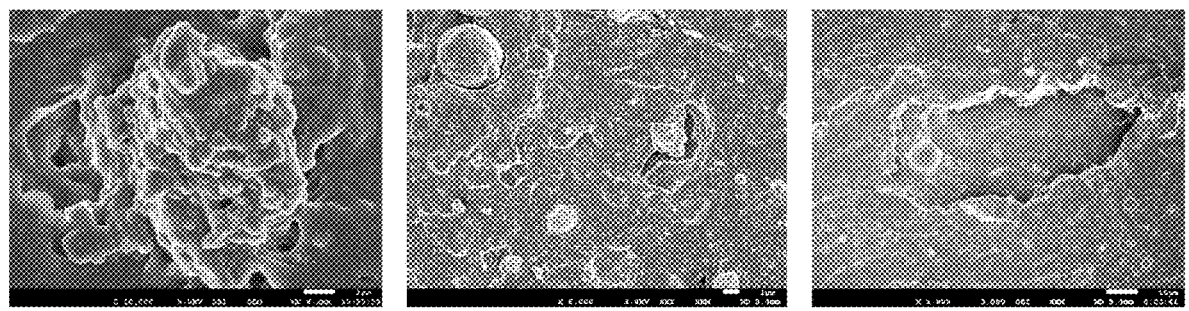
FIG. 5 shows SEM images corresponding to the fatigue characteristic curve of vulcanized rubber after thinning and passing through rollers for 10 times.

The SEM images corresponding to FIG. 4 are as shown in FIG. 5, wherein the image on the left corresponds to the segment B-C, the image in the middle corresponds to the segment C-D, and the image on the right corresponds to the segment D-E. In the image on the left, edges of fillers and compounding agent particles, which are not dispersed uniformly, are partially separated from the rubber matrix to produce micro-damage points; in the image in the middle, the micro-damage points propagate to form micro-cracks; and in the image on the right, the micro-cracks continually propagate to form a larger damaged area; and the damaged area continuously propagate until the structure is damaged. It can be seen from the result of FIG. 3 that the fatigue curve provided by the present invention can effectively characterize fatigue conditions. It can be seen from the result of FIG. 5 that the fatigue curve provided by the present invention can effectively characterize fatigue conditions.

EXAMPLE 2

1) Formula: experimental raw materials were weighed according to a formula of tread rubber for truck tires: 100 phr of NR, 0 phr, 20 phr or 50 phr of carbon black N234, 1.3 phr of sulfur, 1.1 phr of an accelerant NS, 3.5 phr of zinc oxide, 2.0 phr of stearic acid, 2.0 phr of an anti-aging agent 4020, 1.0 phr of an anti-aging agent RD, and 1.5 phr of microcrystalline wax.

2) Preparation of vulcanized rubber: an internal mixer was used for mixing, with the initial temperature set to 80° C. and the rotor speed of 80 rpm; after the initial temperature was reached, NR was added and mixed for 1 minutes and 30 seconds; then, zinc oxide and stearic acid were added and mixed to 2 minutes and 30 seconds, and one half of carbon black was added and mixed to 4 minutes; then, the anti-aging agents, the microcrystalline wax and the remaining carbon black were added and were continually mixed to 5 minutes and 30 seconds, and then were continually mixed to 7 minutes after sweeping; then, rubber discharge was performed on an open mill; The parameters of the open mill were set as follows: the roller speed ratio was 25/18, the roller temperature was 45° C., the initial roller pitch was 0.8 mm. After the rollers were covered with the rubber, NS and sulfur were added for continuous mixing; after being combined with the powder, the rubber was cut for 3 times on ¾ parts of left and right sides, respectively; and after the roller pitch was adjusted to carry out thinning and passing through rollers for 5 times, batch out was performed and roller pitch for carrying out the batch out was 1.8 mm. After being cooled and placed for 8 hours, the compound rubber was tested for vulcanization characteristics at 150° C. The vulcanization for test pieces was performed on an HS-100T-RTMO plate vulcanizing machine according to determined process optimum cure time t90.

3) Preparation of test samples: a type 2 dumbbell-shaped test sample was cut into a plurality of strips according to the requirements of GB/T 528-2009, and every 5 dumbbell-shaped test samples were grouped; and each piece of process rubber was cut into 20 groups of test samples.

4) Preparation of fatigue testing specimens: a dynamic fatigue test used a De Mattia rubber flexural fatigue tester, with the tensile strain of 100% strain, fatigue frequency of 5 Hz, and fatigue cycles of 0, 100, 200, 300, 400, 600, 800, 1000, 2000, 4000, 6000, 8000, 10000, 25000, 50000, 100000 and 500000, respectively. The testing specimens were taken off after each group of testing specimens reach the pre-set fatigue cycles, and were placed for later use. The last group of testing specimens were tested until fatigue damages were caused to obtain testing specimens with different fatigue cycles of rubber of three formulas. After they were placed for 24 hours, a tensile stress-strain performance test was performed.

5) Characterization of the initial fatigue damage and development process: 300% stress at definite elongation of the testing specimens with different fatigue cycles was determined by using a Zwick electronic tensile testing machine, and was used to plot for the fatigue cycles to obtain fatigue characteristic curves of rubber of three different formulas, as shown in FIG. 4.

Figure 6:
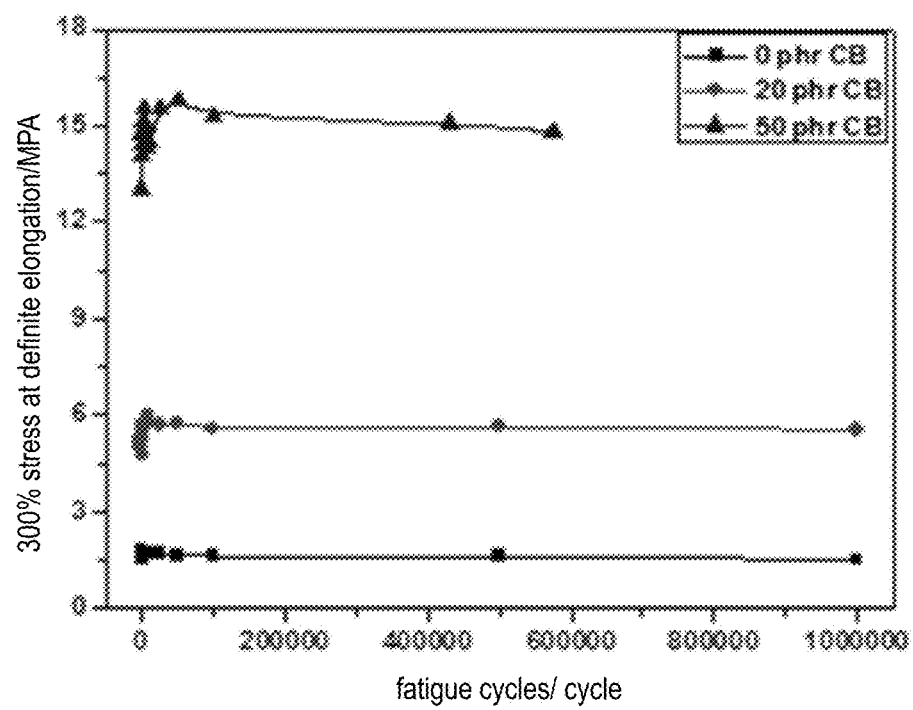
FIG. 6 is a fatigue characteristic curve of vulcanized rubber with different carbon black content.

FIG. 6 shows a curve before 1 million times of fatigue. The curve for rubber without carbon black is gentle, characterizing that the inner structure of rubber has no obvious changes;

the curve for rubber added with 20 phr of carbon black has a weak peak, and becomes gentle subsequently, characterizing that a few of micro-damage points exist in the rubber and the cracks propagate slowly;

the curve for rubber filled with 50 phr of carbon black has a strong peak, and drop gently subsequently, characterizing that many micro-damage points exist in the rubber, which continually form a large damaged area after continuous fatigue.

Figure 7:
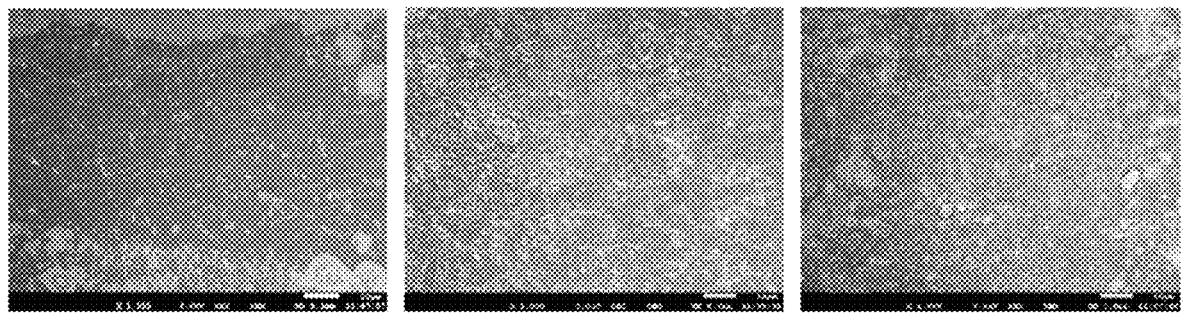
FIG. 7 shows SEM images corresponding to the fatigue characteristic curve of vulcanized rubber with different carbon black content.
Figure 7:
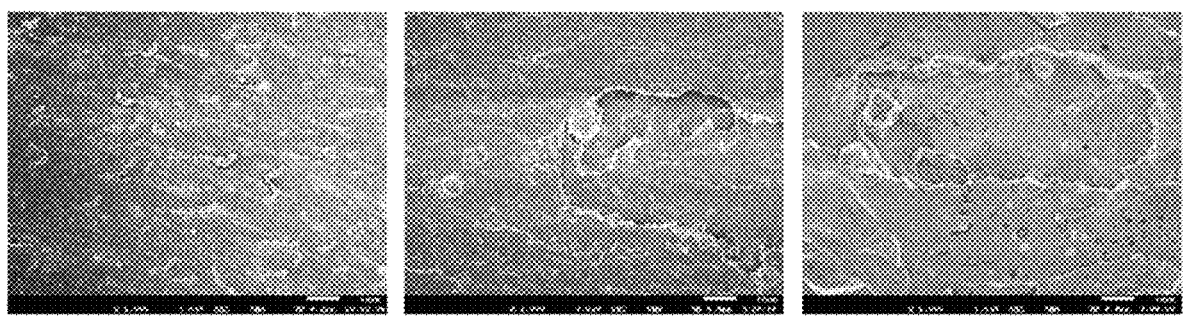
Figure 7:
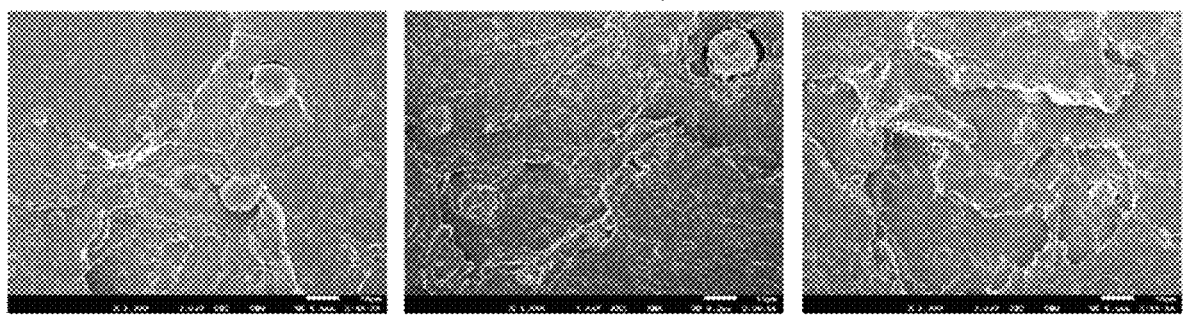

The SEM images corresponding to FIG. 6 are as shown in FIG. 7; a few of damage appearances are formed in the fatigue process of the rubber not filled with the carbon black and no damage points are found on the surface of the testing specimen until 1 million times of fatigue, and therefore, the 300% stress at definite elongation basically has no change along the increase of the fatigue cycles;

Although the amount of carbon black in the rubber filled with 20 phr of carbon black is small, there are still a small amount of carbon black aggregates formed by uneven dispersion, which are separated from the matrix at the early stage of fatigue, and therefore, there is small change of peak value of the stress at constant elongation at the early stage of fatigue. The propagation speed of cracks is relatively slow due to the small amount of micro-damage points, so the curve of the stress at constant elongation is gentle.

At the initial stage of fatigue, large-size carbon black aggregate particles in the vulcanized rubber filled with 50 phr of carbon black are separated from the matrix to form micro-damage points. With the increase of fatigue degree, the damage points gradually propagate to the periphery, and the strength of the peripheral rubber decreases. During stretching, a large damaged area is formed around the micro-damage points, and the damaged areas caused by the propagation of nearby micro-damage points are connected and fused with each other after continuous fatigue, and furthermore, macro-damages are produced in the testing specimen, which are consistent with the fatigue curve.

The above-mentioned results show that the testing and characterization method provided by the present invention can effectively characterize the initial fatigue damage and development process of the vulcanized rubber.

The technical features not described of the present invention can be implemented through or by using the prior art, which is not described herein. It should be noted that the above description is not intended to limit the present invention, and the present disclosure is not limited to the above examples. Changes, modifications, additions or replacements made by those of ordinary skill in the art within the essential range of the present invention should fall within the protection scope of the present invention.

What is claimed is:

1. A testing and characterization method for an initial fatigue damage and development process of vulcanized rubber, wherein the method comprises the following steps:

(1) preparing vulcanized rubber:

preparing a rubber compound according to a test formula designed for testing rubber, and vulcanizing the rubber compound to obtain a vulcanized test piece;

(2) preparing test samples:

cutting the vulcanized test piece into type 2 dumbbell-shaped test samples according to the requirements specified in GB/T 528-2009, and recording each 5 of dumbbell-shaped test samples as one group;

(3) preparing fatigue testing specimens:

testing the fatigue life of the test samples by using a fatigue tester, and firstly carrying out a fatigue life test on one set of test samples to obtain the number of fatigue life cycles of the test samples;

setting a pre-set number of fatigue test cycles of the test samples according to the total fatigue life cycles of the test samples;

testing in accordance with GB/T 1688-2008; after the test samples are tested for the pre-set number of fatigue cycles, taking off the test samples from the fatigue tester to obtain fatigue testing specimens;

(4) characterizing the initial fatigue damage and development process:

determining the stress at definite elongation of the fatigue testing specimens of different fatigue cycles by using a tensile machine, and plotting for the fatigue cycles by using the stress at definite elongation to obtain a fatigue life curve, wherein in the curve results:

from the starting point of the curve, along with the increase of the fatigue cycles, if the stress at definite elongation drops linearly, this section of curve characterizes that the vulnerable structure in the rubber is damaged; if the curve is gentle, the curve represents that the inner structure of the rubber is not damaged;

subsequently, along with the increase of the fatigue cycles, if the stress at definite elongation increases to the first peak, this section of curve characterizes that macromolecular chains in the rubber slip and short chains in a chemical cross-linked structure extend to produce an orientation; a higher peak characterizes a greater produced amplitude of variation;

subsequently, along with the increase of the fatigue cycles, if the stress at definite elongation drops to the trough, this section of curve characterizes that a carbon black aggregate in the rubber is separated from a rubber matrix to produce micro-damages; a higher dropping amplitude of the curve characterizes a higher speed at which the damages occur; a lower trough of the curve characterizes a more severe degree of damages;

subsequently, along with the increase of the fatigue cycles, if the stress at definite elongation increases to the second peak, this section of curve characterizes that initial damages of the rubber appear, micro-damage points in the rubber propagate and the macromolecular chains in the rubber are oriented; a higher height of the second peak in the curve characterizes a greater extent of orientation;

finally, along with the increase of the fatigue cycles, if the stress at definite elongation slowly drops, this section of curve characterizes that micro-cracks in the rubber propagate until the macrostructure is damaged; and a longer dropping duration of the curve characterizes a longer fatigue life of the rubber.

2. The testing and characterization method according to claim 1, wherein in Step (1), the thickness of the vulcanized test piece is 2.00 mm±0.2 mm.

3. The testing and characterization according to claim 1, wherein in Step (3), the fatigue tester is a De Mattia rubber flexural fatigue tester.

4. The testing and characterization according to claim 1, wherein a testing mode of the fatigue test life is tensile fatigue, and testing conditions of the tensile fatigue comprise tensile strain, frequency and temperature.

5. The testing and characterization method according to claim 1, wherein in Step (3), a principle for pre-setting is that the test cycles are as dense as possible in the initial period, and data intervals are widened in the middle and later periods.

6. The testing and characterization method according to claim 1, wherein in Step (4), the fatigue tester tensile machine is a Zwick electronic tensile testing machine.

7. The testing and characterization method according to claim 1, wherein in Step (4), the stress at definite elongation is 100%, 200% or 300% stress at definite elongation.

* * * * *